(12) United States Patent  
Chen et al.

(10) Patent No.: US 12,149,174 B2  
(45) Date of Patent: Nov. 19, 2024

(54) BOOST CONVERTER WITH AUTOMATIC CURRENT BALANCING

(71) Applicant: Wayne State University, Detroit, MI (US)

(72) Inventors: Jianfei Chen, Lanham, MD (US); Caisheng Wang, Troy, MI (US)

(73) Assignee: Wayne State University, Detroit, MI (US)

( * ) Notice: Subject to any disclaimer, the term of this patent is extended or adjusted under 35 U.S.C. 154(b) by 231 days.

(21) Appl. No.: 17/780,198

(22) PCT Filed: Nov. 25, 2020

(86) PCT No.: PCT/US2020/062285  
§ 371 (c)(1),  
(2) Date: May 26, 2022

(87) PCT Pub. No.: WO2021/108598  
PCT Pub. Date: Jun. 3, 2021

(65) Prior Publication Data  
US 2022/0407423 A1 Dec. 22, 2022

Related U.S. Application Data

(60) Provisional application No. 62/941,427, filed on Nov. 27, 2019.

(51) Int. Cl.  
*H02M 1/00* (2007.01)  
*H02M 3/158* (2006.01)  
*H02M 7/44* (2006.01)

(52) U.S. Cl.  
CPC .......... *H02M 3/1586* (2021.05); *H02M 1/007* (2021.05); *H02M 7/44* (2013.01)

(58) Field of Classification Search  
CPC ... H02M 1/007; H02M 3/1582; H02M 3/1586  
See application file for complete search history.

(56) References Cited

U.S. PATENT DOCUMENTS 5,736,842 A * 4/1998 Jovanovic ......... H02M 3/33576  
363/21.04  
6,239,584 B1 * 5/2001 Jang ..................... H02M 3/158  
323/222

(Continued)

FOREIGN PATENT DOCUMENTS

CN 104218798 A 12/2014  
WO 2015037204 A1 3/2015

OTHER PUBLICATIONS

International Search Report dated Mar. 1, 2021 for copending International App. No. PCT/US2020/062285.

(Continued)

*Primary Examiner* — Gary A Nash  
(74) *Attorney, Agent, or Firm* — Fishman Stewart PLLC

(57) ABSTRACT

A boost or DC-DC converter includes a first output and a second output, a first inductor having a first side and a second side, the first side of the first inductor being connectable in electrical communication with a first output of a power supply or DC voltage source, and a second inductor having a first side and a second side, the first side of the second inductor being connectable in electrical communication with the first output of the power supply, the first inductor being inversely coupled to the second inductor. The converter includes a first switch in communication with the second side of the first inductor and a second output of the power supply, and a second switch in communication with the second side of the second inductor and the second output of the power supply.

20 Claims, 10 Drawing Sheets

(56) References Cited

U.S. PATENT DOCUMENTS

| | | | |
|---|---|---|---|
| 7,023,186 B2* | 4/2006 | Yan | H02M 3/155 |
| | | | 323/224 |
| 2013/0076135 A1* | 3/2013 | Zhu | H02J 3/381 |
| | | | 307/43 |
| 2015/0097546 A1* | 4/2015 | Pan | H02M 3/158 |
| | | | 323/311 |
| 2017/0054364 A1* | 2/2017 | Ferdowsi | H02M 3/1584 |

OTHER PUBLICATIONS

Yun Zhang et al., "A Switched-Capacitor Interleaved Bidirectional Converter With Wide Voltage-Gain Range for Super Capacitors in EVs," in IEEE Transactions on Power Electronics, vol. 35, No. 2, pp. 1536-1547, Feb. 2020, doi: 10.1109/TPEL.2019.2921585.

\* cited by examiner

BOOST CONVERTER WITH AUTOMATIC CURRENT BALANCING

CROSS-REFERENCE TO RELATED APPLICATIONS

This application is a national phase application of and claims priority to International Patent Application No. PCT/US2020/062285, filed on Nov. 25, 2020, which claims the benefit of U.S. Provisional Patent Application No. 62/941,427 filed Nov. 27, 2019, the contents of each of which is hereby incorporated by reference in their entirety.

FIELD OF TECHNOLOGY

Exemplary fields of technology for the present disclosure may relate to, for example, a boost converter with automatic current balancing and reduced electrical stress in components for high-voltage operation.

BACKGROUND

Multilevel step-up dc-dc converters have caught increasing interest and are used in many applications, such as wind farms, solar power generation systems, large-scale grid-connected fuel cell systems, high-power charging stations for electric vehicles, and dc grids, as examples. In these systems, a multilevel step-up dc-dc converter can be employed to regulate an unstable low-level input voltage to a stable high-level voltage and to provide a required dc link voltage for the backend inverter.

One of the challenges facing such systems is how to attain a large voltage gain, low component stress, and small ripples with a simple topology. Several multilevel step-up dc-dc converters have been proposed in recent years. As one example of a non-isolated multilevel step-up dc-dc converter, a three-level Boost converter may be used and further may be adopted to combine with a three-level diode-clamped inverter to achieve medium voltage and high power output. Owing to the interleaved modulation scheme, small input current ripples and low component stresses can be achieved in this kind of multilevel boost converter.

However, the input terminal and the output terminal may not share the same ground, which may result in additional maintenance requirements and increased electro-magnetic interference (EMI). A flying-capacitor based three-level Boost converter may be used to address this problem and good results can be achieved. However, similar to other Boost converters, the flying-capacitor based three-level Boost converter faces an inherent limitation: the voltage gain may be limited to be no more than $1/(1-d)$, where d is the duty cycle. In addition, this converter may include a complicated control scheme to balance the flying-capacitor voltage.

Another flying-capacitor based three-level Boost converter with an intrinsic voltage doubler may be utilized. In addition to the advantages of the topology, the two input inductor currents of the converter may be self-balanced due to the flying-capacitor. Moreover, the voltage gain of a converter of this design could be increased to be $2/(1-d)$ instead of $1/(1-d)$ when d is over 0.5. However, voltage stresses across the output diode and the output capacitor may be the same as the output voltage, which can be a disadvantage.

A modified converter may be attained by adding one more flying-capacitor and one more diode to form a symmetrical flying-capacitor based topology, which may help decrease voltage stresses across output diodes by half of its output voltage. However, the voltage stresses across the other diodes may become high although the voltage stresses across the output diodes are decreased. In addition, the aforementioned three-level Boost converters may need to employ isolated driver circuits as all the switches typically do not share the same ground. Besides, only one output capacitor in this three-level Boost converter bears the whole output voltage, which may not be a good choice in medium and high voltage applications.

In general, placing several split capacitors connected in series is a good solution to reducing voltage stress across each capacitor. One solution is the application of a diode-capacitor voltage multiplier on a basic Boost converter and it can achieve a high voltage gain and self-balanced capacitor voltages. However, large input current ripples and high current stresses across individual switches may be inevitable as an interleaved scheme cannot be used in this solution.

A series of modular multilevel dc-dc converters may also be used. However, they are more suitable for high voltage applications, such as HVDC and high voltage drives but may not be a good choice for medium-voltage applications. Based on Buck-Boost converter modules, a modular multilevel dc-dc converter may be used for medium-voltage and high-power applications. The lower-level module output voltage multiplied by $d/(1-d)$ serves as the input voltage of the upper-level module to achieve a large voltage gain. Thus, it is a multi-state dc-dc converter where conversion efficiency can be an issue. Besides, the voltage gain may still be limited in the three-level version, and many components may be required. And, another concern of this converter is that the switches in the upper module may not be grounded at the same point with that in the lower module.

An alternative three-level dc-dc converter may be used to achieve a large voltage gain at the expense of using more switches, diodes and a more complex modulation strategy. Two dc-dc converters may utilize a coupling inductor technique to obtain high voltage gain. However, they are two-state converters, and it may result in low efficiency and the input current ripples may be large. Further, a quadratic buck-boost topology may be used with a large voltage gain at the expense of large input current ripples.

Thus, there is a need for an improved boost converter.

DETAILED DESCRIPTION

Figure 1A:
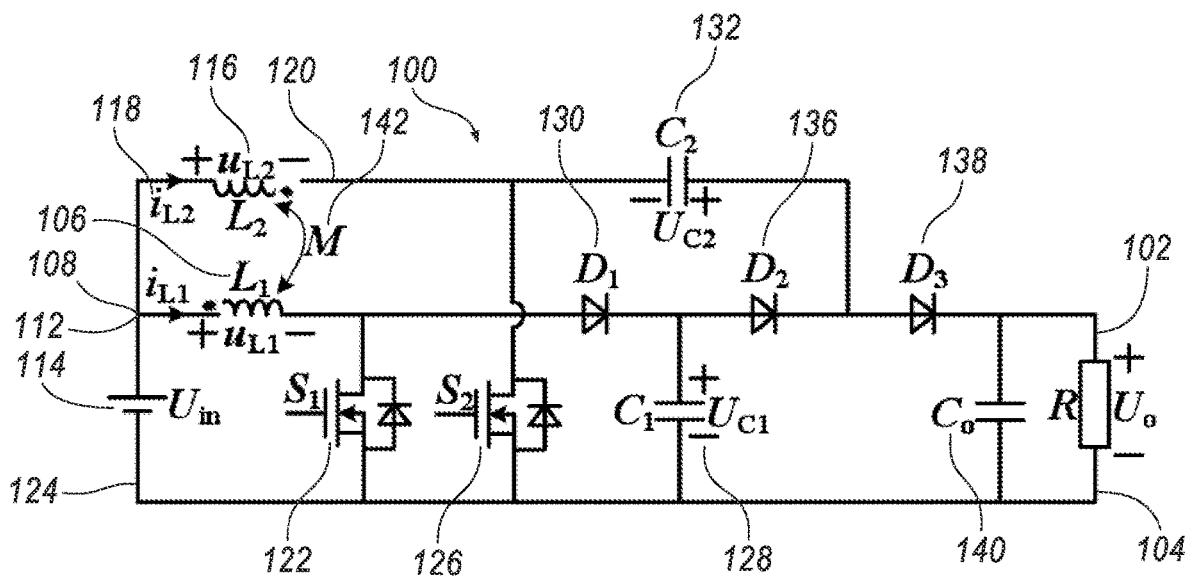
FIG. 1A illustrates an exemplary converter according to the disclosure.
Figure 1B:
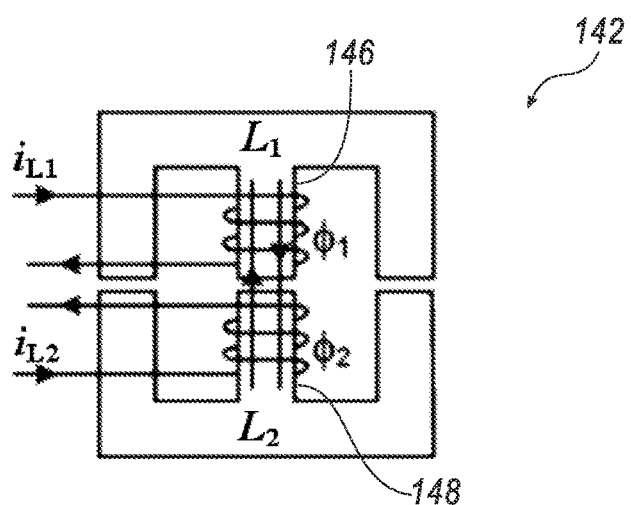
FIG. 1B illustrates a magnetic coupling between inductors shown in FIG. 1A.

FIG. 1A illustrates an exemplary converter 100 according to the disclosure, with FIG. 1B showing magnetic coupling between inductors shown in FIG. 1A. As seen in FIG. 1A, the disclosed converter is an integration of two boost converters, switched-capacitor technique, and coupled inductor technique. Boost converter 100 includes a first output 102 and a second output 104. A first inductor 106 includes a first side 108 and a second side 110, first side 108 of first inductor 106 being connectable with a first output 112 of a DC power supply 114. A second inductor 116 includes a first side 118 and a second side 120, first side 118 of second inductor 116 being connectable with first output 112 of DC power supply 114, first inductor 106 being inversely coupled to second inductor 116. A first switch 122 is in electrical communication with second side 110 of first inductor 106 and a second output 124 of DC power supply 114. A second switch 126 is in electrical communication with second side 120 of second inductor 116, and connectable to second output 124 of DC power supply 114.

Boost converter 100 includes a first capacitor 128 connected between second output 124 of DC power supply 114 and second side 110 of first inductor 106. A first diode 130 is connected between second side 110 of first inductor 106 and first capacitor 128. A second capacitor 132 is connected to second side 120 of second inductor 116. A second diode 136 is connected between first capacitor 128 and second capacitor 132. Boost converter 100 includes a third diode 138 and a third capacitor 140, third diode 138 being connected between second capacitor 136 and third capacitor 140, third capacitor 140 being connected between third diode 140 and output 102, 104 of DC-DC converter 100.

In one example, first and second switches 122, 136 are transistors, and in another example first and second switches 122, 136 are MOSFETs. Thus, first inductor 106, first switch 122, first diode 130, and first capacitor 128 form a first boost converter, referred to in the alternative as Boost I, and second inductor 116, second power switch 126, third diode 138, second capacitor 132 form a second boost converter, referred to in the alternative as Boost II. Output voltage 102, 104 of converter 100 is generated across third capacitor 140.

First capacitor 128, second diode 130, second capacitor 132, and second switch 126 thereby formulate a switched-capacitor network. Furthermore, as shown in FIG. 1B, first inductor 106 in Boost I and second inductor 116 develop an inverse-coupled configuration based on one magentic or EE core. As shown in FIG. 1A, M 142 is a mutual inductance and first inductor 106 and second inductor 116 are self-inductances with the same value of L, or the same inductance. Two windings 146, 148 have the same turns N. Thus, basic voltage and current relationships for a coupled inductor are given by the following expressions:

$$u_{L1} = N\frac{d\phi_1}{dt} = (L-M)\frac{di_1}{dt} + M\frac{d(i_1-i_2)}{dt} = L\frac{di_1}{dt} - M\frac{di_2}{dt}; \quad (1)$$

$$u_{L2} = N\frac{d\phi_2}{dt} = (L-M)\frac{di_2}{dt} - M\frac{d(i_1-i_2)}{dt} = L\frac{di_2}{dt} - M\frac{di_1}{dt}; \quad (2)$$

$$u_M = M\frac{d(i_1-i_2)}{dt} \quad (3)$$

The two windings 146, 148 in the inverse-coupled configuration share the DC current equally, while the flux in the core is canceled since the flux generated by the two windings 146, 148 has opposing polarity. Thus, the core is not easy to be saturated when operated at high current. Also, the magnetic component volume and weight can be reduced with the inverse-coupled inductor technique.

To simplify the steady-state analysis of the disclosed converter, the operating conditions are assumed to be as follows:

1) All components in FIGS. 1A and 1B are assumed to be ideal and converter 100 operates in continuous conduction mode (CCM).
2) All capacitances are large enough that each capacitor voltage is considered constant over each switching period.

To enable interleaved operation of the disclosed converter, the gate signals of the two switches 122, 126 are driven by a same duty cycle d with a phase shift of 180°. The equivalent circuits of the disclosed converter 100 under different operating states are presented in FIG. 2(a-d).

As shown in FIGS. 2A-2D, there are four switching states I, II, III and IV. A detailed operating principle under different switching states is given as below, with element numbers not shown or referenced below so the figures and corresponding states remain clearly legible. Instead, element numbers are removed and instead referred to as in FIG. 1A as well as FIGS. 2A-2D. For instance, first inductor 106 is labeled as such in FIG. 1A, while also including a designator "$L_1$". First inductor 106 is present in FIGS. 2A-2D, but for simplicity sake is subsequently referred to as "$L_1$". Likewise, first switch 122 includes a designator "$S_1$" and is referred to as such in subsequent discussion. First diode 130 is referred to as "$D_1$", as another example.

State I: Both two switches $S_1$, $S_2$ are turned on and the diode $D_2$ is forward biased as a the capacitor voltage across capacitor $C_1$ is slightly higher than capacitor voltage for capacitor $C_2$. During State I, both inductors $L_1$, $L_2$ are charged by input source $U_{in}$. Meanwhile, capacitor $C_2$ is charged by capacitor $C_1$. The output capacitor $C_O$ (third capacitor 140) provides energy for the load. The current flowing path of the disclosed converter 100 at this state is presented in FIG. 2A.

$$u_{L1}=u_{L2}=U_{in} \quad (4)$$

$$U_{C1}=U_{C2} \quad (5)$$

State II: When switch $S_1$ is turned on and switch $S_2$ is turned off, diode $D_3$ is forward. Inductor $L_1$ is still charged by input source $U_{in}$, which may also supply energy to the load together with the inductor $L_2$ and a flying-capacitor or capacior $C_2$. The current flowing path of the disclosed converter at this state is presented in FIG. 2B.

$$u_{L1}=U_{in} \quad (6)$$

$$u_{L2}=U_{in}+U_{C2}-U_o \quad (7)$$

State III: When switch $S_1$ turned off and switch $S_2$ is turned on, diodes $D_1$, $D_2$ are both forward. Inductor $L_2$ is charged by the input source $U_{in}$, which also supplies energy to $C_1$ and $C_2$ together with inductor $L_1$. Meanwhile, capacitor $C_2$ is charged by capacitor $C_1$. The output capacitor $C_0$ provides energy for the load. The current flowing path of the disclosedconverter at this state is presented in FIG. 2C.

$$u_{L1}=U_{in}-U_{C1} \qquad (8)$$

$$u_{L2}=U_{in} \qquad (9)$$

$$U_{C1}=U_{C2} \qquad (10)$$

State IV: Both switches $S_1$, S2 are turned off while $D_1$ and $D_3$ are on forward biased. The current flowing path of the disdclosed converter at this state is presented in FIG. 2(D).

$$u_{L1}U_{in}-U_{C1} \qquad (11)$$

$$u_{L2}=U_{in}+U_{C2}-U_o \qquad (12)$$

For the disclosed converter, when the duty cycle d is greater than 0.5, the converter operates at periodic states of I, II, I, and III. When the duty cycle d is smaller than 0.5, it operates at periodic states of IV, II, IV, and III. Overall, whatever the duty cycle d is, two equations can be attained based on the known Voltage-Second Balance Principle during one switching period.

$$dT_s*U_{in}+(1-d)T_s*(U_{in}-U_{C1})=0 \qquad (13)$$

$$dT_s*U_{in}+(1-d)T_s*(U_{in}+U_{C2}-U_o)=0 \qquad (14)$$

Then, the voltage gain G and the capacitor voltages can be achieved:

$$G = \frac{U_o}{U_{in}} = \frac{2}{1-d} \qquad (15)$$

$$U_{C1} = U_{C2} = \frac{1}{1-d}U_{in} \qquad (16)$$

Thus, according to the disclosure, a boost converter includes a first output and a second output, a first inductor having a first side and a second side, the first side of the first inductor being connectable with a first output of a power supply, a second inductor having a first side and a second side, the first side of the second inductor being connectable with the first output of the power supply, the first inductor being inversely coupled to the second inductor, a first switch in electrical communication with the second side of the first inductor and connectable to a second output of the power supply, and a second switch in electrical communication with the second side of the second inductor and connectable to the second output of the power supply.

III Comprehensive Performance Analysis

A. Voltage Stress

In the disclosed converter, the voltage stresses across the switches, diodes, and capacitors are half of the output voltage.

$$U_{S1} = U_{S2} = U_{D1} = U_{D2} = U_{D3} = U_{C1} = U_{C2} = \frac{1}{1-d}U_{in} = \frac{1}{2}U_o \qquad (17)$$

where voltages across $U_{S1}$, $U_{S2}$, $U_{D1}$, $U_{D2}$, $U_{D3}$, $U_{C1}$, $U_{C2}$ represent voltage stresses across $S_1$, $S_2$, $D_1$, $D_2$, $D_3$, $C_1$, $C_2$.

B. Automatic Current Balancing

Whatever the duty cycle d is, average current across $S_1$, $S_2$ can be obtained as follows:

$$\begin{cases} I_{S1} = dI_{L1} \\ I_{S2} = I_{L2} \end{cases} \qquad (18)$$

The average currents across $D_1$, $D_2$, $D_3$ are essentially the same, or ideally identical, with the value equal to the average output current as follows:

$$I_{D1} = I_{D2} = I_{D3} = I_o = \frac{U_o}{R} \qquad (19)$$

Figure 2A:
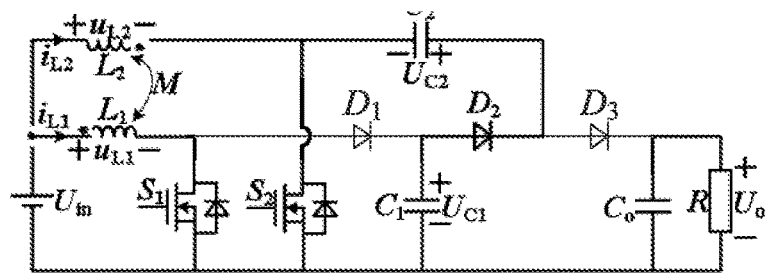
FIGS. 2A-2D illustrate four switching states I, II, III and IV.
Figure 2B:
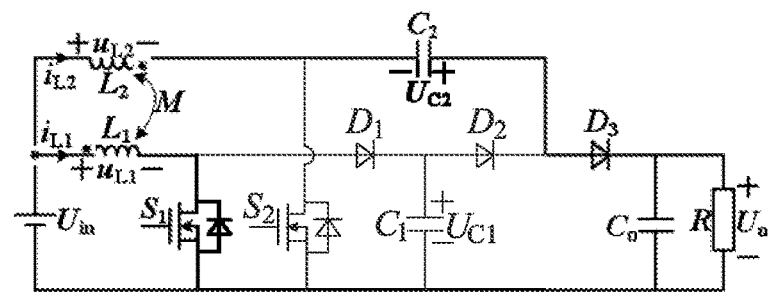
Figure 2C:
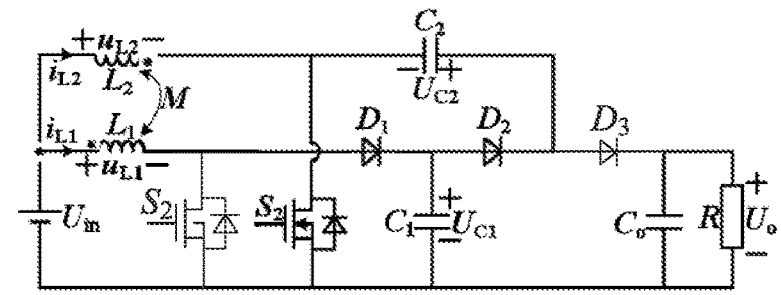
Figure 2D:
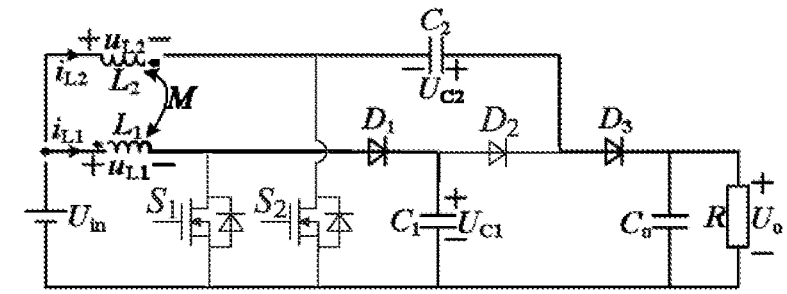

When the duty cycle d is over 0.5, the operating period of state II in FIG. 2B can be expressed by $(1-d)T_s$ during one switching period. During state II, capacitor $C_2$ is charged with current expressed by:

$$i_{C2\_charged} = I_{L2} - \frac{U_o}{R} \qquad (20)$$

During the remained operating period $dT_s$, $C_s$ is discharged with the current expressed by:

$$i_{C2\_discharged} = -\frac{U_o}{R} \qquad (21)$$

According to the known Ampere-Second Balance Principle:

$$(1-d)T_s\left(I_{L2} - \frac{U_o}{R}\right) + dT_s\left(-\frac{U_o}{R}\right) = 0 \qquad (22)$$

The average current of inductor $L_2$ may be obtained by simplifying (22) as below:

$$I_{L2} = \frac{U_o}{R(1-d)} \qquad (23)$$

When the duty cycle d is smaller than 0.5, the same formula as (23) can be obtained. It should be noted that the average current of inductor $L_2$ could be also derived as below.

During one whole switching period, the average charging current flowing through $C_2$ is essentially the same as the average current flowing through $D_2$. Thus, the increased charges of $C_2$ during one switching period are $I_{D2}*T_s$. In addition, when d is over 0.5, the flying-capacitor $C_2$ is only discharged during State II and the average discharging current flowing through $C_2$ is $I_{L2}$ with the discharging time $(1-d)T_S$. When d is smaller than 0.5, the flying-capacitor $C_2$ is discharged during State II and State IV with the average discharging current $I_{L2}$ and the total discharged time $(1-d)T_S$. It can be seen that the decreased charges of $C_2$ during one switching period is $I_{L2}*(1-d)T_S$ no matter what the duty cycle d is. Therefore, by applying the Ampere-Second Balance Principle on $C_2$:

$$I_{D2}*T_s=I_{L2}*(1-d)T_s \qquad (24)$$

According to (24), the same formula as (23) can be achieved. On the other hand, the average current of $L_1$ can be easily obtained as below:

$$I_{L1} = \frac{I_{D1}}{1-d} = \frac{U_o}{R(1-d)} \quad (25)$$

According to (18)-(25), the average currents across all switches and diodes are:

$$\begin{cases} I_{L1} = I_{L2} = \frac{U_o}{(1-d)R} \\ I_{S1} = \frac{dU_o}{(1-d)R} \\ I_{S2} = \frac{U_o}{(1-d)R} \\ I_{D1} = I_{D2} = I_{D3} = \frac{U_o}{R} \end{cases} \quad (26)$$

Hence, additional current-sharing control strategies, as well as current sensors in a conversion system based on multiple dc-dc converters, are not necessary for the disclosed converter.

C. Voltage Ripples and Current Ripples

In the switched-capacitor network, the flying-capacitor $C_2$ could be considered to be an energy buffer. According to (24) and (25), the increased or decreased charges on $C_2$ is $U_0 * T_s / R$, which could be described alternatively as $C_2 * \Delta u C_2$, where $\Delta u C_2$ represents a voltage ripple of $C_2$. Finally, the voltage ripple of $C_2$ is derived by:

$$\Delta u_{C2} = \frac{U_o}{RC_2 f_s} \quad (27)$$

The voltage ripples of $C_1$ may be obtained:

$$\Delta u_{C1} = \frac{U_o d}{RCf_s} \quad (28)$$

Additionally, the current ripples of $L_1$ and $L_2$ are obtained by:

$$\Delta i_{L1} = \Delta i_{L2} = \frac{U_{in}}{L} \frac{d}{f_s} \quad (29)$$

And, input current ripple can be determined by:

$$\Delta i_{in} = \begin{cases} \frac{U_{in}}{L} \frac{2d-1}{f_s} & d > 0.5 \\ \frac{U_{in}}{L} \frac{d(1-2d)}{f_s(1-d)} & d \leq 0.5 \end{cases} \quad (30)$$

Figure 3A:
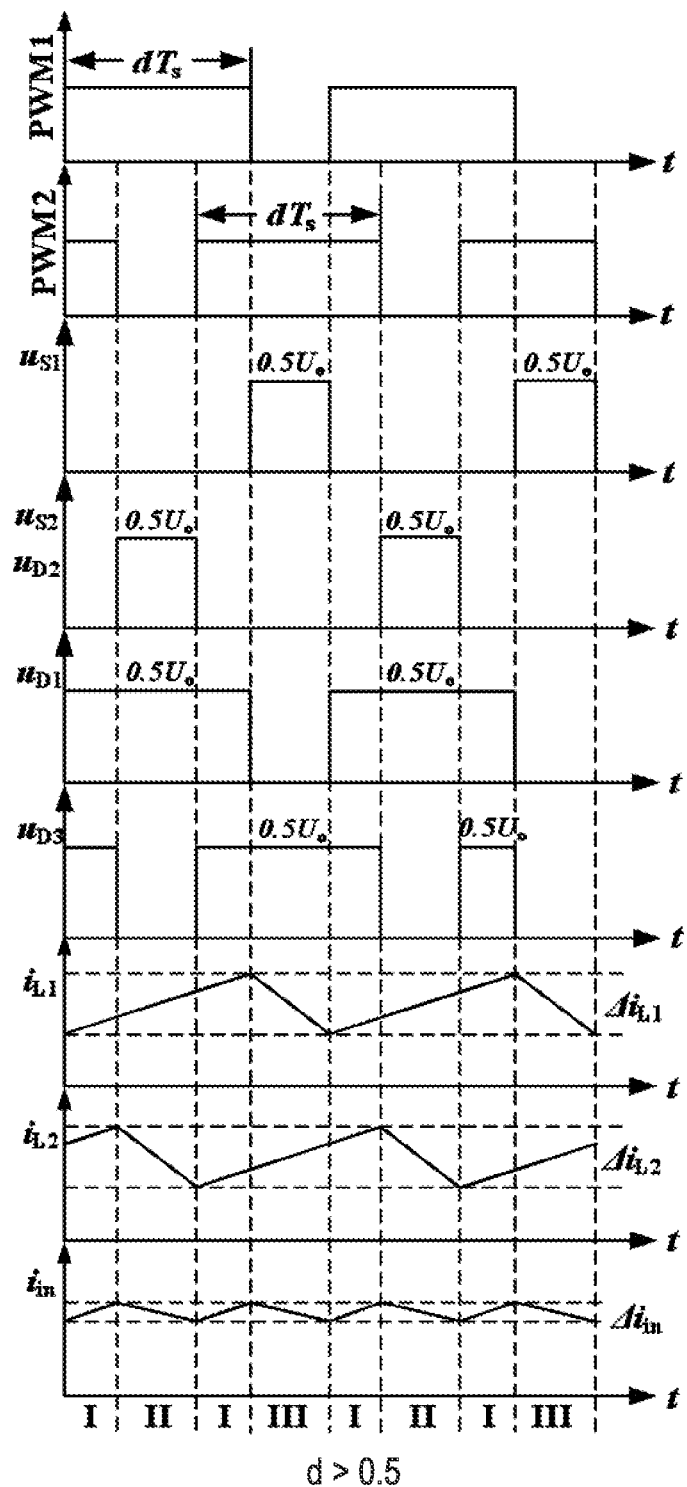
FIG. 3A illustrates current, voltage, and gate signal waveforms for a duty cycle over 0.5.
Figure 3B:
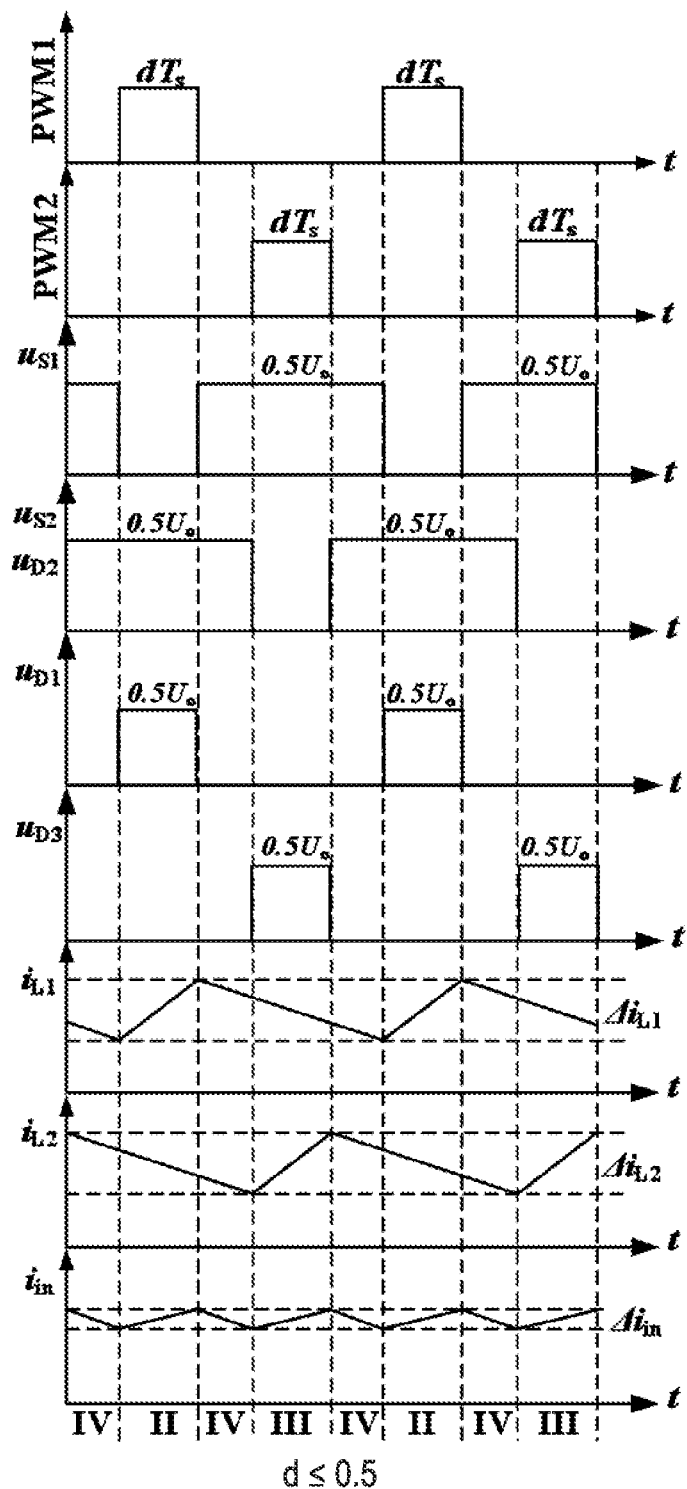
FIG. 3B illustrates current, voltage, and gate signal waveforms for a duty cycle less than 0.5.

Referring now to FIGS. 3A and 3B, various current, voltage, and other states are illustrated therein. When the duty cycle is over 0.5, the gate signals, voltage waveforms and current waveforms of the disclosed converter in FIG. 1A are illustrated in FIG. 3A. When the duty cycle is less than 0.5, the gate signals, voltage waveforms and current waveforms of the disclosed converter in FIG. 1A are illustrated in FIG. 3B. In FIGS. 3A and 3B, PWM1 and PWM2 are the gate signals of the power switches $S_1$ and $S_2$; d is the duty cycle; $T_s$ is the switching period; $U_0$ is the output voltage; $U_{S1}$, $U_{S2}$ are the voltages across the power switches $S_1$, $S_2$; $u_{D1}$, $u_{D2}$, $u_{D3}$ are the voltages across the didoes $D_1$, $D_2$, $D_3$; $i_{L1}$, $i_{L2}$ are the currents of the inductors $L_1$, $L_2$; $\Delta i_{L1}$, $\Delta i_{L2}$ are the current ripples of the inductors $L_1$, $L_2$; $i_{in}$ is the input current and $\Delta i_{in}$ is the input current ripple; I, II, III and IV are the switching states in FIGS. 2A, 2B, 2C, and 2D, respectively.

D. Extended Topologies

The disclosed converter is an integration of two boost converters and one switched-capacitor network. It can be extended to a topology integrating three boost converters and two switched-capacitor networks or even more generally a topology integrating n boost converters and (n−1) switched-capacitor networks, shown in FIGS. 4A and 4B.

Figure 4A:
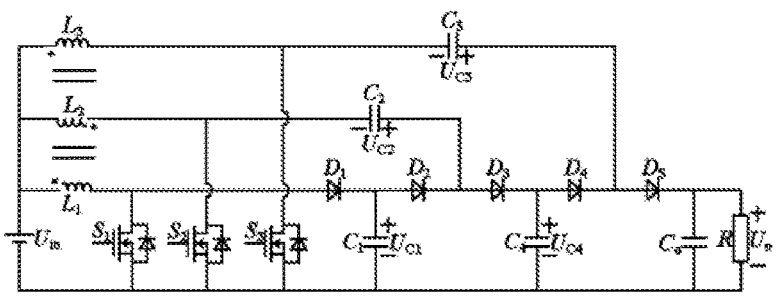
FIG. 4A illustrates an extended converter topology integrating three boost converters.
Figure 4B:
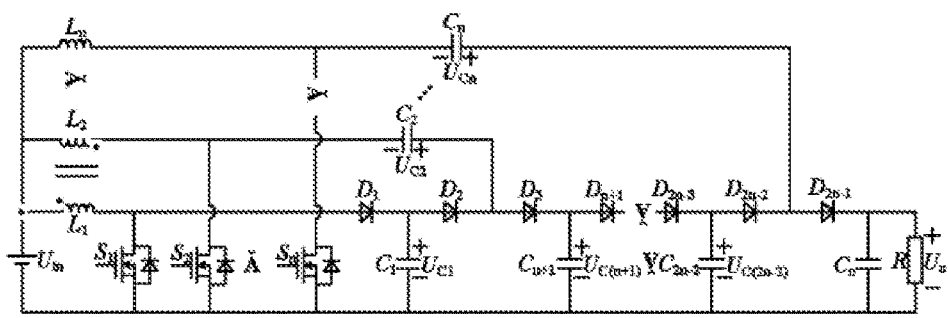
FIG. 4B illustrates a general topology integrating n boost converters.

FIG. 4A illustrates an extended converter topology integrating three boost converters and two switched-capacitor networks; FIG. 4B illustrates a general topology integrating n boost converters and (n−1) switched-capacitor networks.

The voltage gain of the general topology in FIG. 4B can be achieved by:

$$G = \frac{U_o}{U_{in}} = \frac{n}{1-d} \quad (31)$$

The capacitor voltages are:

$$U_{C1} = U_{C2} = \frac{1}{1-d} \quad (32)$$
$$U_{C3} = U_{C(n+1)} = \frac{2}{1-d}$$
$$\ldots$$
$$U_{Cn} = U_{C(2n-2)} = \frac{n-1}{1-d}$$

Referring to FIGS. 5A and 6A-6D, a third switch $S_3$ is connected between the first inductor $L_1$ and the first capacitor $C_1$.

As such, referring to FIGS. 4A and 4B, the disclosed converter further includes a second capacitor $C_2$ connected to a second side of second inductor $L_2$, and a fourth switch $S_4$ connected between the first capacitor $C_1$ and the second capacitor $C_2$. The boost converter further includes a fifth switch $S_5$ and a third capacitor $C_3$, the fifth switch $S_5$ being connected between the second capacitor $C_2$ and the third capacitor $C_3$, the third capacitor $C_3$ being connected between the fifth switch $S_5$ and the second output of the power source.

Figure 5A:
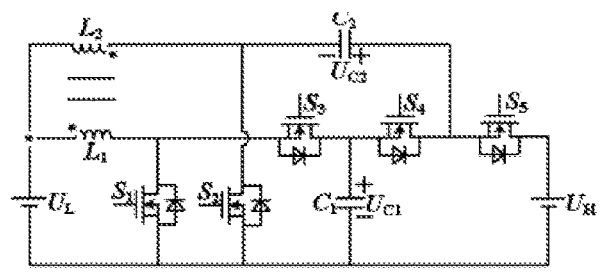
FIG. 5A illustrates a bidirectional topology.
Figure 5B:
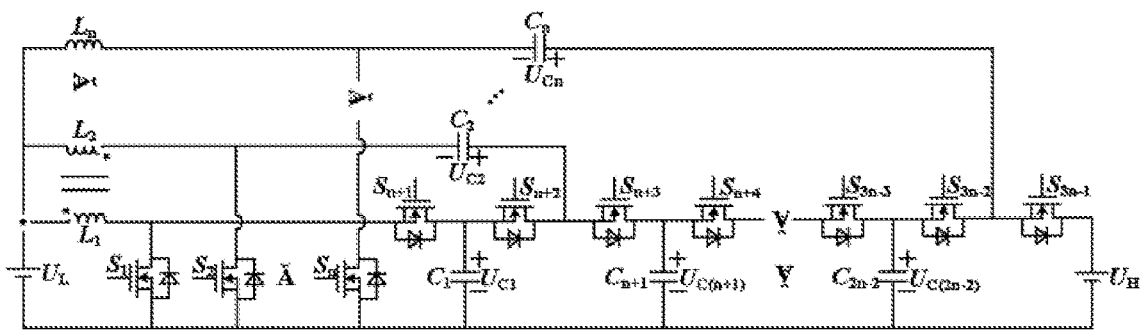
FIG. 5B illustrates a more general bidirectional topology.
Figure 6A:
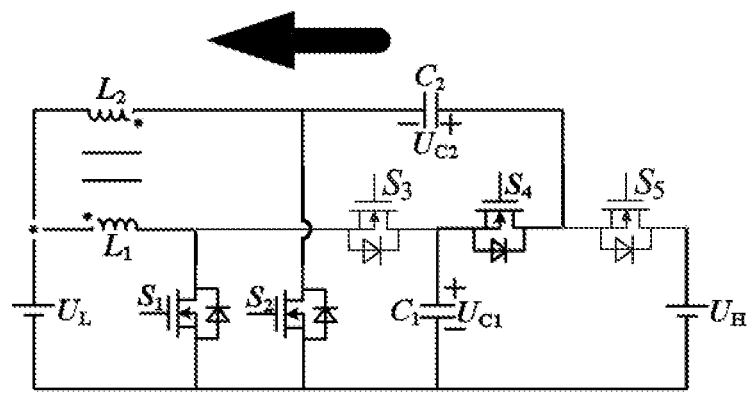
FIGS. 6A-6D illustrate four switching states of the topology of FIG. 5A.
Figure 6B:
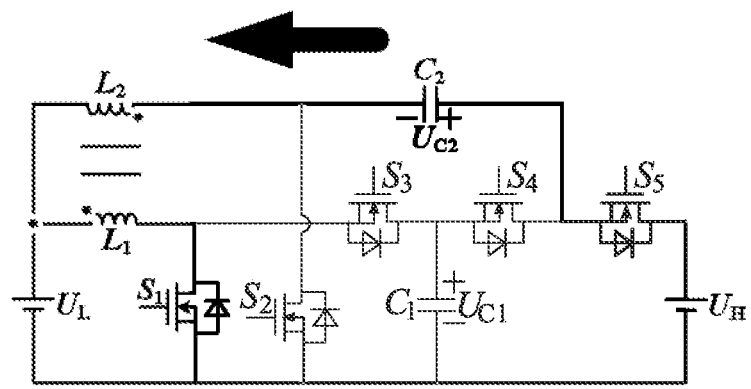
Figure 6C:
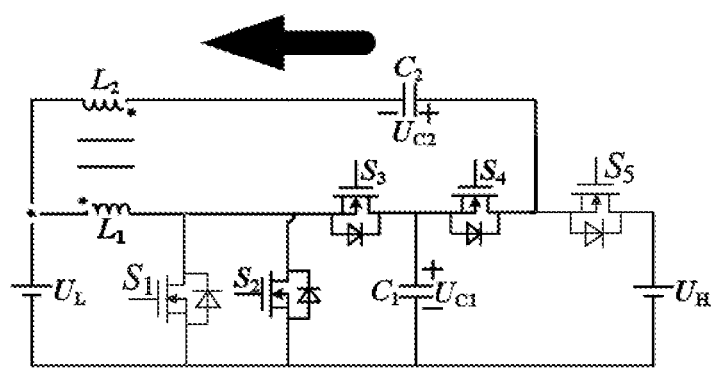
Figure 6D:
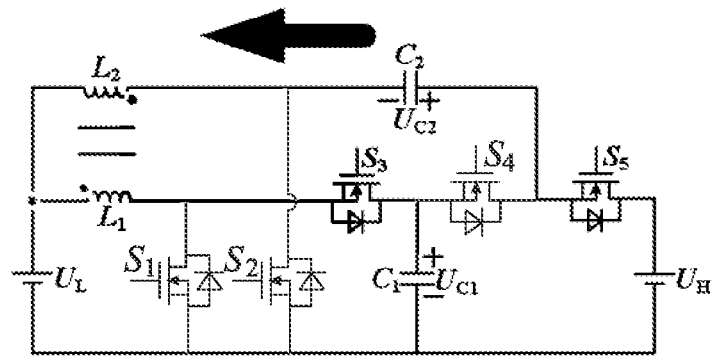

The disclosed topology can also be extended to have a bidirectional topology as shown in FIGS. 5A and 5B. As for the disclosed bidirectional topology in FIG. 5A, it can be used in battery storage system or electric vehicles where bidirectional power flow is necessary, and in a more general topology in FIG. 5B. The disclosed converter can be extended to a bidirectional topology by replacing all diodes by power switches, used in battery storage system and 12V/1V data center application, as an example. For a 12V/1V conversion system, the extended bidirectional topology in FIG. 5A can be designed with high switching frequency (around up to 5 MHz) to convert 12V voltage to 1V voltage to supply energy for analog or digital chips.

There are four switching states and corresponding equivalent circuits are presented in FIGS. 6A-6D.

Figure 10:
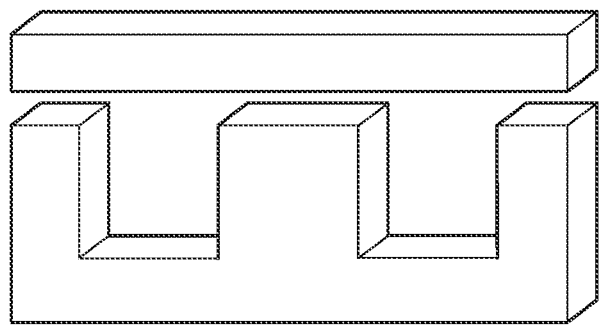
FIG. 10 illustrates a EI core configuration.
Figure 11:
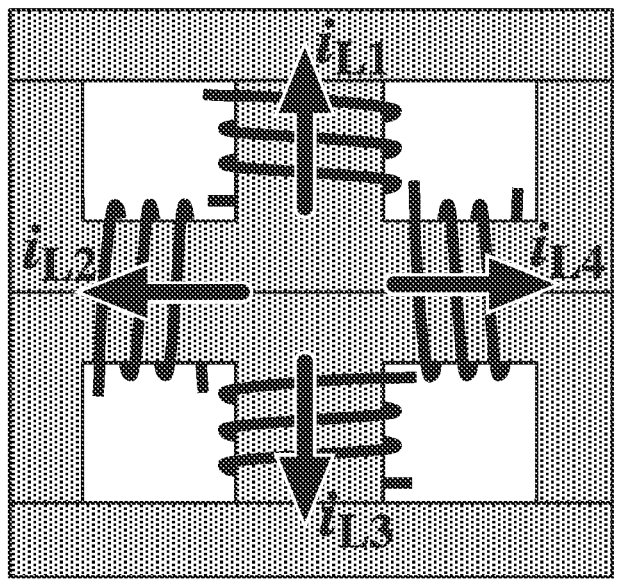
FIG. 11 illustrates two EI core configurations.

Normally a different number of inductors, the coupled inductor configuration is different. Taking four inductors as an example, the inverse-coupled inductor configuration is given in FIG. 11 where two EI cores are used. The EI core configuration is also given in FIG. 10. As shown in FIG. 11, four separate inductors $L_1$, $L_2$, $L_3$, $L_4$ are integrated into one inverse-coupled inductor using two EI cores. The four inductor currents $i_{L1}$, $i_{L2}$, $i_{L3}$, and $i_{L4}$ are all flowing from inner side to the outside of the EI cores to cancel DC fluxes. As a result, the size and weight of it are greatly reduced.

DC-DC converters have been widely used as a critical component in renewable/alternative energy systems, transportation electrification, and wherever a conversion from one DC source to another is needed. For DC energy systems that include cells connected in series and parallel, such as photovoltaic energy systems, battery storage systems, and fuel cells, it is desirable to have fewer cells/components connected in series so that the system can achieve higher system reliability, easier system management (such as battery balancing), and overall higher system efficiency.

As it has been well recognized, the overall system efficiency of fuel cells, batteries and solar cells can be significantly reduced due to a large number of cells connected in series to achieve a desirable high voltage. The system efficiency can drop over 7% due to inevitable mismatch of characteristics of all the cells connected in series and other packing issues since the string current is limited by the weakest cell in the string. Fewer cells connected in series with more in parallel result in lower voltage and higher current.

Figure 7:
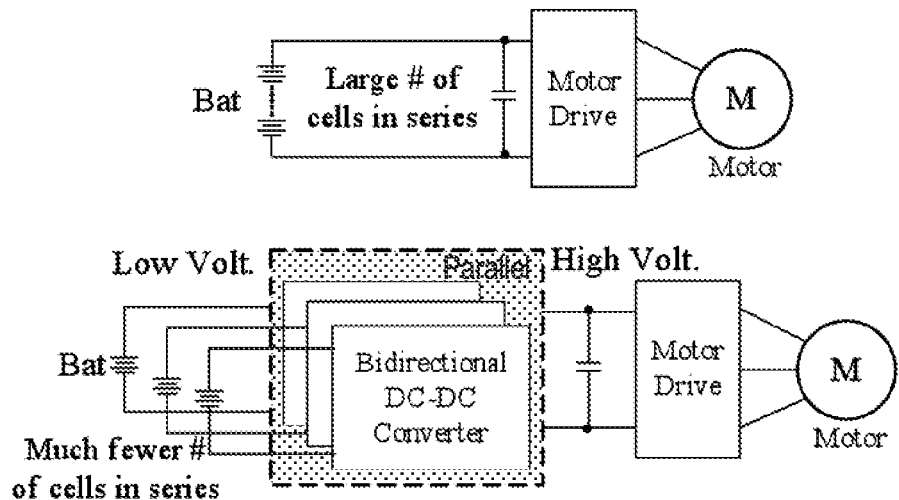
FIG. 7 illustrates exemplary two-stage systems incorporating the disclosed topology.

However, a higher DC-link voltage is typically included for better system performance including higher system efficiency. In electric vehicles (EVs), for example, the inverter DC input voltage has a tendency to increase in order to utilize high-speed high-power motor and improve conversion efficiency and power density of the inverter. In the power grid, a higher voltage is preferable for delivering electricity over longer distance with less power loss. Hence, in addition to high efficiency, high power density and cost effectiveness, there also has been a fast-growing need for DC-DC converters to have high voltage conversion ratio and high reliability. In addition to high voltage gain, the desirable DC-DC converter should have small input current ripple, which is very important to a battery or fuel cell based vehicle system. Recent advancement and availability of wide bandgap (WBG) semiconductors bring a new era for such DC-DC converters to achieve a two-stage system, as shown in FIG. 7.

Figure 8:
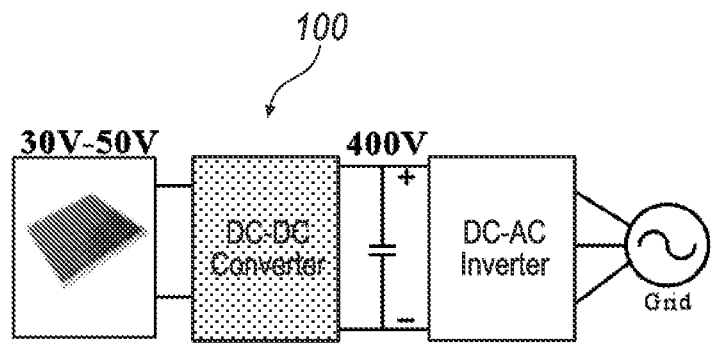
FIG. 8 illustrates a residential two-stage energy conversion system incorporating the disclosed topology.

Likewise FIG. 8 illustrates, as an example, a solar PV system having converter 100 positioned therein. Thus, for a photovoltaic (PV) generation system, the DC-DC converter is normally required to have high voltage gain to adjust the wide output voltage range of PV panels. Taking residential PV generation application as an example, the two-stage energy conversion system is presented in FIG. 8. The step-up DC-DC converter boosts the low and unstable voltage 30V-50V to a stable DC-link voltage 400V.

In high power applications, several DC/DC converters are connected in parallel to increase the high power rating requirement. However, there are large circulating currents between every two DC/DC converter modules, which lead to increased power loss.

Figure 9A:
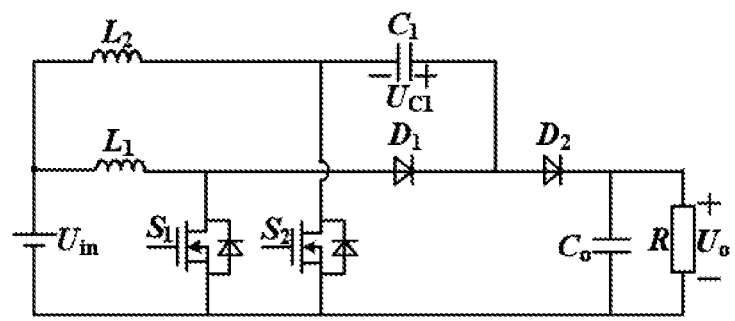
FIG. 9A illustrates a series-capacitor boost converter for illustration purposes.

The disclosed converter in FIG. 1a has the following attractive features:

1) Like the series-capacitor boost converter in FIG. 9A, the disclosed converter has small input current ripple and automatic current balancing function. Comparatively, the disclosed converter in FIG. 1A has a higher voltage gain and automatic current balancing function within a full duty cycle (0<d<1) than a series-capacitor boost converter. As for the series-capacitor boost converter in FIG. 9A, the voltage stresses across switches $S_1$, $S_2$, capacitor $C_1$ and diode $D_2$ are half of the output voltage, while the diode $D_1$ endures the full the output voltage. Especially when the number of boost modules increases, this difference becomes much more apparent. Furthermore, the automatic current balancing function of the disclosed converter is effective during the full duty cycle range (0<d<1), while a conventional converter is only effective when the duty cycle d is over 0.5.

Figure 9B:
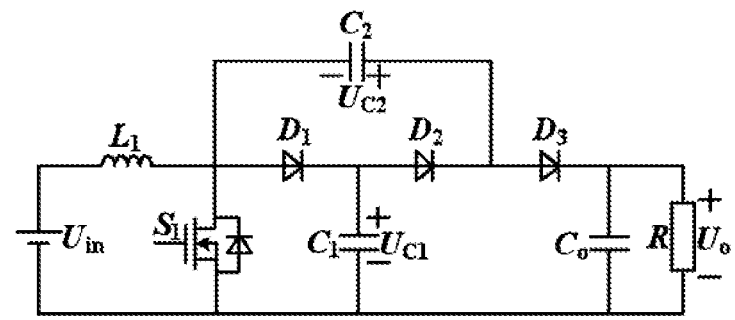
FIG. 9B illustrates a switched-capacitor boost converter for illustration purposes.

2) Both the disclosed converter in FIG. 1A and the switched-capacitor boost converter in FIG. 9B have low voltage stresses across components. However, the disclosed converter in FIG. 1A results in much lower input current ripple than a hybrid switched-capacitor boost converter due to the interleaving configuration of the disclosed converter.

This disclosure introduces an interleaved hybrid switched-capacitor boost converter, which may show a high voltage gain, small component stress, and small input current ripple. In addition, automatic current balancing for the two inductor currents can be another appealing capability of the disclosed converter. Coupled inductor technique may be used to reduce the volume of the magnetic components and the inductor current ripple.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many examples and applications other than those provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system comprising:
a DC voltage source having a first output and a second output; and
a DC-DC converter having an output, the DC-DC converter comprising:
a first inductor having a first side and a second side, the first side of the first inductor being in electrical communication with the first output of the DC voltage source;
a second inductor having a first side and a second side, the first side of the second inductor being in electrical communication with the first output of the DC voltage source, the first inductor being inversely coupled to the second inductor;
a first switch in communication with the second side of the first inductor and the second output of the DC voltage source;
a second switch in communication with the second side of the second inductor and the second output of the DC voltage source; and
a first capacitor connected between the second output of the DC voltage source and the second side of the first inductor.

2. The system of claim 1, further comprising a DC-AC converter coupled to an output of the DC-DC converter, an output of the DC-AC converter connectable to an electrical grid.

3. The system of claim 1, the DC-DC converter further comprising a second capacitor connected to the second side of the second inductor.

4. The system of claim 1, the DC-DC converter further comprising a first diode connected between the second side of the first inductor and the first capacitor.

5. The system of claim 4, the DC-DC converter further comprising a second capacitor connected to the second side of the second inductor.

6. The system of claim 5, the DC-DC converter further comprising a second diode connected between the first capacitor and the second capacitor.

7. The system of claim 6, the DC-DC converter further comprising a third diode and a third capacitor, the third diode connected between the second capacitor and the third capacitor.

8. The system of claim 7, wherein the third capacitor is connected between the third diode and the output of the DC-DC converter.

9. A boost converter, comprising:
a first output and a second output;
a first inductor having a first side and a second side, the first side of the first inductor being connectable with a first output of a power supply;
a second inductor having a first side and a second side, the first side of the second inductor being connectable with the first output of the power supply, the first inductor being inversely coupled to the second inductor;
a first switch in electrical communication with the second side of the first inductor and connectable to a second output of the power supply;
a second switch in electrical communication with the second side of the second inductor and connectable to the second output of the power supply; and
a first capacitor connected between the second output of the power supply and the second side of the first inductor.

10. The boost converter of claim 9, further comprising a first diode connected between the second side of the first inductor and the first capacitor.

11. The boost converter of claim 10, further comprising a second capacitor connected to the second side of the second inductor.

12. The boost converter of claim 11, further comprising a second diode connected between the first capacitor and the second capacitor.

13. The boost converter of claim 12, further comprising a third diode and a third capacitor, the third diode being connected between the second capacitor and the third capacitor, the third capacitor being connected between the third diode and the output of the DC-DC converter.

14. The boost converter of claim 9, wherein the first and second switch are transistors.

15. The boost converter of claim 9, wherein the first and second switch are MOSFETs.

16. The boost converter of claim 9, further comprising a third switch connected between the first inductor and the first capacitor.

17. The boost converter of claim 16, further comprising:
a second capacitor connected to the second side of the second inductor, and
a fourth switch connected between the first capacitor and the second capacitor.

18. The boost converter of claim 17, further comprising a fifth switch and a third capacitor, the fifth switch being connected between the second capacitor and the third capacitor, the third capacitor being connected between the fifth switch and the second output of the power source.

19. A boost converter, comprising:
a first output and a second output;
a first inductor having a first side and a second side, the first side of the first inductor being connectable with a first output of a power supply;
a second inductor having a first side and a second side, the first side of the second inductor being connectable with the first output of the power supply, the first inductor being inversely coupled to the second inductor;
a first switch in electrical communication with the second side of the first inductor and connectable to a second output of the power supply;
a second switch in electrical communication with the second side of the second inductor and connectable to the second output of the power supply; and
a third switch connected between the first inductor and a first capacitor.

20. The boost converter of claim 19, further comprising a first diode connected between the second side of the first inductor and the first capacitor.

* * * * *